T. H. McNUTT, DEC'D.
A. E. McNUTT, ADMINISTRATRIX.
LEVEL.
APPLICATION FILED FEB. 4, 1913.
1,089,571.
Patented Mar. 10, 1914.
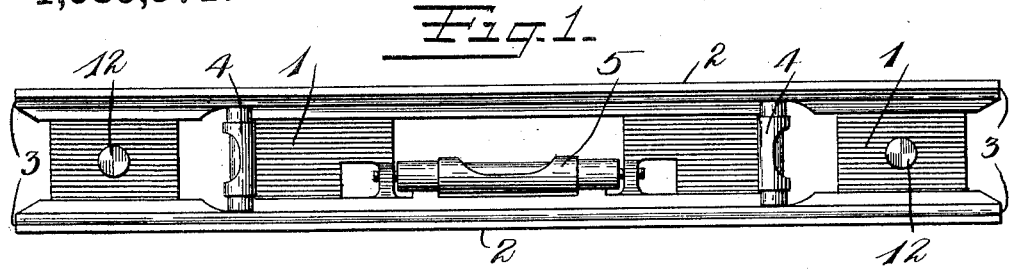
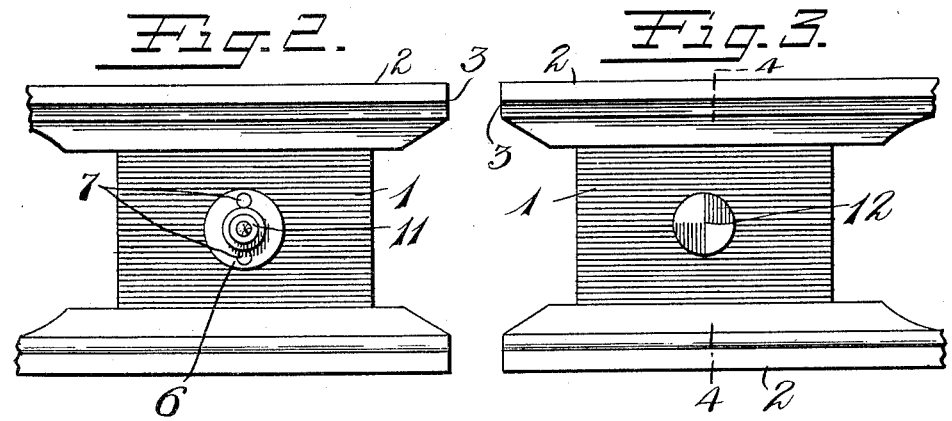
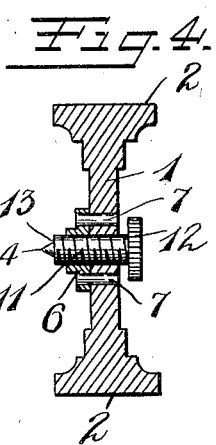
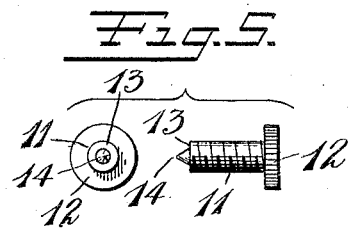
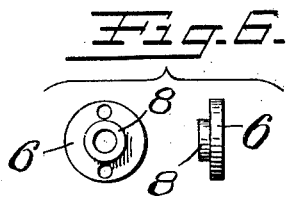
Witnesses:
INVENTOR
T. H. McNutt, dec'd
Anna E. McNutt
Administratrix
By his Attorneys

UNITED STATES PATENT OFFICE.

THOMAS H. McNUTT, DECEASED, LATE OF PINE BLUFF, ARKANSAS, BY ANNA ELEANOR McNUTT, ADMINISTRATRIX, OF OKLAHOMA, OKLAHOMA, ASSIGNOR TO THE STANLEY RULE & LEVEL COMPANY, OF NEW BRITAIN, CONNECTICUT, A CORPORATION OF CONNECTICUT.

LEVEL.

1,089,571.    Specification of Letters Patent.    Patented Mar. 10, 1914.

Application filed February 4, 1913. Serial No. 746,148.

*To all whom it may concern:*

Be it known that THOMAS H. MCNUTT, deceased, late a citizen of the United States and resident of Pine Bluff, in the county of Jefferson, State of Arkansas, did invent new and useful Improvements in Levels, of which the following is a full, clear, and exact description.

This invention relates to improvements in levels and is more especially designed to provide means whereby the level may be readily held in adjusted position by the operator, while a scratch awl or other marking device is drawn along the straight edge of the level.
This and other advantages are described in detail in the following specification taken in connection with the accompanying drawings forming part thereof and illustrating a preferable embodiment of the invention.
In these drawings: Figure 1 is a view in side elevation of a level embodying the invention. Fig. 2 is a fragmentary view of one end of the level with one of the holding devices applied thereto. Fig. 3 is a similar view of the opposite face of the level. Fig. 4 is a vertical section through the level taken on the line 4—4 of Fig. 3. Fig. 5 is a view in end and side elevation showing the holding point, and Fig. 6 is a detail view in front and edge elevation of the bearing plate coöperating therewith.

Referring to the drawings by numerals, 1 indicates, generically, the body of a metal level provided with the parallel straight edges 2 extending longitudinally thereof and provided with straight edges 3 at its ends. The body of the level is preferably recessed to receive level glasses 4 extending transversely thereof and both facing in opposite direction, so that both levels may be viewed by the operator in plumbing down a joist underneath a floor, for instance. The level also preferably has its body recessed to receive a third level glass 5 extending longitudinally of the level body. In scribing or otherwise marking a line upon woodwork along one of the straight edges 2 of this level, it is very difficult for the operator to hold the level and to also handle a scratch awl or other tool at the same time. This invention provides means whereby this may be readily accomplished, these means preferably taking the following form.

At a plurality of points longitudinally of the level body and intermediate its edges, I secure bearing plates 6 to the body of the level by any suitable means, as for instance, by the pins 7 inserted through apertures formed in the bearing plates and in the level body, and having their ends upset against said plates and level body to secure said plates firmly to the body of the level. These bearing plates 6 are preferably provided with a boss 8 and with an internally threaded aperture extending therethrough. The outer face of the boss 8 terminates preferably at a point within the plane of the outer edges of the body of the level. A timber engaging device is provided in the form of a threaded pin 11 having a milled head 12 and formed adjacent its outer end with a shoulder 13 from which point the pin is reduced and extends outwardly to a point. The pin 11 is inserted from the side of the level body opposite a bearing plate 6 through a bore formed in said level body in alinement with the threaded bore of the bearing plate, the screw threads thereof, coöperating with said threaded bore and being adapted to move the pin within said bore to bring its pointed end into holding engagement with woodwork to which the level is applied. These pins 11 are preferably moved up to bring their shoulders 13 against the face of the timber engaged by their points, to utilize said shoulder as a bearing face. It will be evident therefore, that with a level of the type described, provided with such holding devices an operator may place such a level against timber and by means of the level glasses thereon adjust the level to the desired position. The pointed pins 11, may then be turned by the operator to move their points 14 into holding engagement with the timber, the level body being pressed against the timber with one hand, while the pin is being operated with the other, and the points 14 of the pin serving to retain the level body in proper position against the timber. The operator may then readily hold the level against the timber with one hand while with the other he moves a scratch awl or other marking implement along the straight edge of the level in the usual manner.

The threaded bore of each bearing plate with which the threaded pins 11 coöperate, is of substantial length, affording a long bearing for its threaded pin, the bearing plate being preferably of a thickness which will bring it somewhat within the plane of the side bearings of the level body. The shouldered end 13 of the pins 11 aid substantially in the holding engagement of the point of the pin with the timber. When the level is not in use, the pins 11 may be screwed back to bring their points 14 within the threaded bores and out of way, so that they cannot injure objects with which they would otherwise contact if projected. It will also be observed that the overall length of the screw 11 together with its head and point is not in excess of the maximum thickness of the level body. Hence, when the point 14 is retired to the inoperative position, the level body can be placed flatwise with its side bearings properly engaging with a flat piece of timber, whereas if the length of the screw with its point and head exceeded the maximum thickness of the level body, one end or the other would project at all times making it impossible to get a true bearing of the level body against a flat wall or piece of timber. It is to be noted also that the pointed pins 11 may not only be used as level supporting devices, but that when arranged in longitudinal alinement, the indentations made by their points may be utilized for marking and indicating purposes without the necessity of using a scratch awl or other marker along the straight edge of the level.

While a specific embodiment of the invention has been described, it will be obvious that various structural changes are possible within the spirit of the invention and the scope of the appended claim.

What is claimed, therefore, and desired to secure by Letters Patent is:

In a hand level, a level body, a plurality of pins carried by the body, said pins being arranged to project from the same side thereof, the overall length of said pins not exceeding the maximum thickness of the body, with means for projecting said pins so that they will extend slightly beyond one side bearing face of said level body and for retiring said pins so that both ends thereof will not project beyond the opposite side bearing surfaces.

ANNA ELEANOR McNUTT,
*Administratrix of Thomas H. McNutt, deceased.*

Witnesses:
 E. W. BRINDLEY,
 J. S. BRINDLEY.

---

Copies of this patent may be obtained for five cents each, by addressing the "Commissioner of Patents, Washington, D. C."